United States Patent
Ewald et al.

(10) Patent No.: US 9,114,787 B2
(45) Date of Patent: Aug. 25, 2015

(54) SUPPORT CYLINDER FOR A SELF-ENERGIZING HYDRAULIC BRAKE

(75) Inventors: Julian Ewald, Horn-Bad Meinberg (DE); Matthias Liermann, Aachen (DE); Christian Stammen, Holzwickede (DE)

(73) Assignee: Siemens Aktiengesellschaft, Munich (DE)

( * ) Notice: Subject to any disclaimer, the term of this patent is extended or adjusted under 35 U.S.C. 154(b) by 820 days.

(21) Appl. No.: 13/386,504

(22) PCT Filed: Jul. 7, 2010

(86) PCT No.: PCT/EP2010/059721
§ 371 (c)(1),
(2), (4) Date: Feb. 14, 2012

(87) PCT Pub. No.: WO2011/009722
PCT Pub. Date: Jan. 27, 2011

(65) Prior Publication Data
US 2012/0124990 A1 May 24, 2012

(30) Foreign Application Priority Data
Jul. 21, 2009 (DE) .......................... 10 2009 034 522

(51) Int. Cl.
| F01B 7/20 | (2006.01) |
| F01B 13/00 | (2006.01) |
| B60T 8/52 | (2006.01) |
| B60T 11/16 | (2006.01) |
| F16D 65/14 | (2006.01) |
| B60T 13/02 | (2006.01) |
| F16D 127/08 | (2012.01) |

(52) U.S. Cl.
CPC . *B60T 8/52* (2013.01); *B60T 11/16* (2013.01); *F16D 65/14* (2013.01); *B60T 13/02* (2013.01); *F16D 2127/085* (2013.01)

(58) Field of Classification Search
CPC ................................. B60T 13/02; B60T 11/16
USPC ........................ 60/533; 92/52, 53, 85 A, 85 B
See application file for complete search history.

(56) References Cited

U.S. PATENT DOCUMENTS

| 3,404,758 A | 10/1968 | Mortimer |
| 5,036,960 A | 8/1991 | Schenk |
| 5,379,868 A * | 1/1995 | Kurasako et al. ............ 188/72.2 |
| 5,544,724 A | 8/1996 | Kurasako |
| 2010/0019567 A1 | 1/2010 | Schiffers et al. |

FOREIGN PATENT DOCUMENTS

| DE | 1530571 A1 | 10/1969 |
| DE | 34 41 128 A1 | 5/1986 |
| DE | 10 2006 050 277 A1 | 4/2008 |
| EP | 0 566 133 A1 | 10/1993 |
| RU | 2115576 C1 | 7/1998 |
| WO | 2008/031701 A1 | 3/2008 |

* cited by examiner

*Primary Examiner* — Edward Look
*Assistant Examiner* — Daniel Collins
(74) *Attorney, Agent, or Firm* — Laurence A. Greenberg; Werner H. Stemer; Ralph E. Locher

(57) ABSTRACT

A pressure generating device generates a hydraulic pressure as a result of a tensile or compressive load. The device has connections, one of which can be rigidly connected to a frame by way of a mechanism for introducing a mechanical tensile or compressive load, a pressure cylinder and a piston unit extending at least partially and flexibly in the pressure cylinder and bounding a hydraulic chamber filled with hydraulic fluid jointly with the pressure cylinder. The chamber has a simple and inexpensive construction. The connections are connected to the pressure cylinder or the piston unit by way of a coupling device that is configured such that the same hydraulic chamber has pressure applied thereto under tensile load and under compressive load.

11 Claims, 3 Drawing Sheets

SUPPORT CYLINDER FOR A SELF-ENERGIZING HYDRAULIC BRAKE

BACKGROUND OF THE INVENTION

Field of the Invention

The invention relates to a pressure generating device for generating a hydraulic pressure as a result of a tensile or compressive load, comprising connecting means, one of which is connectable to a mechanism for transmitting a mechanical tensile or compressive load, and another of which is connectable rigidly to a frame, comprising a pressure cylinder and a piston unit which extends at least partially and movably in the pressure cylinder and which jointly with the pressure cylinder delimits a hydraulic chamber filled with hydraulic fluid.

The invention further relates to a brake device for braking a moving mass, having a movably guided coupling member for pressing a brake lining against a brake surface and a brake actuator filled with hydraulic fluid and connected to the coupling member for generating an application force which can be applied to the brake lining via the coupling member, the brake lining being connected via a mechanism to a pressure generating device which can be fastened to a frame of the mass to be braked and which generates during braking a hydraulic pressure in a hydraulic chamber connected to the brake actuator via hydraulic lines.

A pressure generating device of this type and a brake device of this type are already known from WO 2008/031701 A1. That document discloses a self-energizing hydraulic brake device which has a brake actuator for generating an application force. The hydraulic pressure force generated by the brake actuator is applied via a mechanical coupling member to brake linings which are pressed under frictional engagement against a rotating brake disk. The brake lining is not supported, as with conventional brakes, on a frame, for example the frame of a train or a motor vehicle. Rather, the brake linings are supported via a suitable lever mechanism on a column of hydraulic fluid. This hydraulic fluid is arranged in a hydraulic chamber of a pressure generating device, the pressure generating device being in the form of a double-rod cylinder. This comprises a pressure cylinder which is divided by a piston into two pressure chambers, the one pressure chamber being pressurized under compressive load and the other pressure chamber under tensile load. Said hydraulic chambers are connected via hydraulic lines to the brake actuator in such a way that the hydraulic chamber which has the higher pressure is connected to the brake actuator, so that the pressure generated in the hydraulic chamber leads to a boosting of the hydraulic pressure in the brake actuator. In this way, self-energization is made available. The self-energization can be regulated by means of control means. The known brake device suffers from the disadvantage that the pressure generating device is in the form of a double-rod cylinder, so that a hydraulic equalizer and a valve for restoring the double-rod cylinder to its starting position are required. However, hydraulic equalization is complex and cost-intensive.

In addition to the use of a double-acting hydraulic cylinder, the use of two single-acting hydraulic cylinders, for example two plunger-type cylinders, as the pressure generating device in a self-energizing hydraulic brake is also known, the one plunger-type cylinder being pressurized under a compressive load and the other plunger-type cylinder under a tensile load. The hydraulic chambers of the plunger-type cylinders are again connected to the brake actuator, so that here too self-energization is achieved. The use of two plunger-type cylinders is complex and cost-intensive because of the necessary hydraulic circuitry.

BRIEF SUMMARY OF THE INVENTION

It is the object of the invention to make available a pressure generating device and a brake device of the type mentioned in the introduction which are simple and inexpensive in construction.

This object is achieved according to the invention in that the connecting means are connected via coupling means to the pressure cylinder or to the piston unit, the coupling means being configured in such a way that the same hydraulic chamber is pressurized under a tensile load and under a compressive load.

The aim of the invention is to transmit tensile and compressive forces to the pressure generating device in such a way that the pressure build-up takes place in one and the same hydraulic chamber. The hydraulic chamber is connected, by means of suitable hydraulic lines attached to a hydraulic outlet of the hydraulic chamber, to the brake actuator of the hydraulic brake, so that a self-energizing hydraulic brake is made available. In order to be able to transmit the compressive and tensile forces arising during braking to the same hydraulic chamber, the use of stops and abutment elements interacting with one another is provided according to the invention, so that the piston unit is loaded with respect to the pressure cylinder independently of the direction of the force transmitted, the force transmitted bearing directly on the hydraulic fluid column. The stops and abutment elements are referred to generally here as coupling means. The coupling means establish an operative connection between a connecting means and the pressure cylinder and/or the piston unit. According to invention the effective piston area for both directions of the deceleration force transmitted in the form of a compressive or tensile load is equal. Since only one hydraulic system is required, a compact structure is made possible. The brake actuator is advantageously connected to the hydraulic chamber via a control unit. According to the invention, fewer sealing points are achieved in comparison to the solutions according to the prior art, resulting in lower costs and lower weight. As compared to a solution with two plunger-type cylinders, a smaller hydraulic capacity is made available according to the invention, whereby less hydraulic fluid is required. The pressure generating device according to the invention, and therefore the brake device according to the invention, have a smaller space requirement and necessitate lower maintenance outlay, as compared to the prior art. Simple replacement of the pressure generating device according to the invention is also possible, since the pressure generating device is connected to the mass to be braked, or to the brake caliper, at only two points, namely the connecting means. Both a simple attachment to the mass to be braked, and a compatible attachment to conventional brakes, are therefore made possible.

The coupling means advantageously comprise hollow sleeve units, each sleeve unit forming gripping arms which come into engagement with stop shoulders formed on the piston unit or on the pressure cylinder in the case of a tensile load, so that the gripping arms and the stop shoulders form tensile coupling means. Each sleeve unit is advantageously connected rigidly to a connecting means. For example, each connecting means is formed integrally on a sleeve unit. The hollow configuration of the sleeve section makes possible free travel of the piston unit or of the pressure cylinder, in one direction, so that a relative movement of each sleeve unit both with respect to the piston unit and with respect to the pressure cylinder is possible. The sleeve unit can therefore act both as a tensile coupling means and as a compressive coupling means, for which purpose they have suitable abutment elements and gripping arms. In this case the gripping arms act both as a driver and as an abutment element or stop. The gripping arms act as an abutment element, for example, under a compressive load. In other words, within the meaning of this development of the invention the compressive coupling means comprise abutment elements formed on the sleeve units, against which the piston unit and the pressure cylinder bear. The tensile coupling means comprise gripping arms formed on the sleeve units which come into engagement with the stop shoulders formed on the piston unit and/or on the pressure cylinder. Self-evidently, the coupling means include both the tensile coupling means and the compressive coupling means.

Advantageously, in the case of a compressive load the gripping arms of one of the sleeve units bear against the pressure cylinder, while the piston unit bears against a compressive abutment element, so that said gripping arms and the compressive abutment element form the compressive coupling means.

The compressive abutment element is advantageously the inner wall of another sleeve unit. In other words, the compressive abutment element is not formed on the sleeve unit, the gripping arms of which bear against the pressure cylinder.

According to an advantageous configuration of the invention, the pressure cylinder is in the form of a cylindrical tube which is arranged at least partially in one of the hollow sleeve units and has a flange section as the stop shoulder which comes into engagement with the gripping arms of said sleeve unit under a tensile load.

The piston unit advantageously has a driver arranged in one of the sleeve units and a piston which is arranged in the pressure cylinder and delimits the hydraulic chamber, the piston and the driver being connected to one another via a piston rod extending through the hydraulic chamber and the driver extending behind the gripping arms of the associated sleeve unit. The expression "extending behind" means here that the driver has, transversely to the pull direction, a larger diameter than the internal diameter of the through-opening of the sleeve unit through which the piston rod extends.

A compression spring which bears against the piston unit and against the pressure cylinder is advantageously arranged in the hydraulic chamber. The compression spring returns the movable piston unit and the movable pressure cylinder to their relative starting position. In the starting position the pressure in the hydraulic chamber is approximately equal to atmospheric pressure.

The hydraulic chamber is connected to a hydraulic tank filled with hydraulic fluid via a hydraulic equalizing orifice. In this way sufficient hydraulic fluid can be drawn in, so that the hydraulic chamber is filled with sufficient hydraulic fluid as its volume increases.

As already set forth, the hydraulic chamber communicates with the brake actuator or the brake cylinder of a hydraulic brake, so that self-energizing is provided.

Control means for regulating a deceleration force are advantageously provided, which force can be transmitted via the mechanism as a tensile or compressive load to the connecting means of the pressure generating device. According to this advantageous development, the self-energizing hydraulic brake with the pressure generating device according to the invention can be regulated as desired, so that adjustable braking decelerations are made available. In order to control this self-energization, a control unit in the form of suitable valves, by means of which the pressure generating device is connected to the brake actuator, is provided. It should be pointed out here that, in the context of the invention, what is regulated is not, for example, the force with which the brake linings are pressed against the moving brake surface. Rather, the deceleration force can be adjusted directly in the context of the invention. The deceleration force is the force with which the brake linings bear against the hydraulic fluid column. This corresponds exactly to the force with which the mass to be braked is decelerated.

Further advantageous configurations and advantages of the invention are the subject matter of the following description of exemplary embodiments of the invention with reference to the figures of the drawing, in which the same reference numerals designate components having the same effect and in which:

DESCRIPTION OF THE INVENTION

Figure 1:
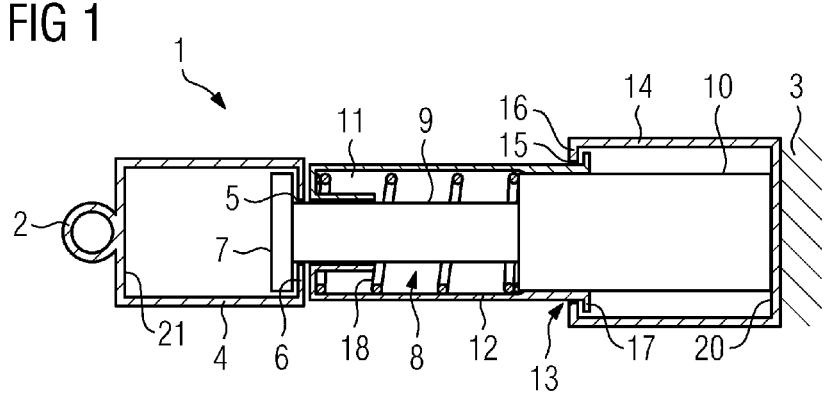
FIG. 1 shows a first exemplary embodiment of the pressure generating device according to the invention in a starting position without an applied force.

FIG. 1 shows an exemplary embodiment of the pressure generating device 1 according to the invention in a starting position. In the starting position no force is transmitted to either of the connecting means. The pressure in the hydraulic chamber is approximately equal to atmospheric pressure. This position is present in the unbraked state, that is, with the brake released. The pressure generating device 1 has a first connecting means 2 which is connected via a lever mechanism (not shown in the figures) to the brake caliper of a friction brake. The brake caliper is connected via suitable coupling means to a brake cylinder in which a brake hydraulic chamber is provided, which chamber is pressurized during a braking process. The brake hydraulic chamber is delimited by a movable brake piston. The pressure generated in the brake hydraulic chamber effects a displacement of the brake piston and therefore a braking movement which is transmitted to the brake linings of the brake caliper via the coupling means. In this way the brake linings are pressed against the mass to be braked, for example the brake disk of a locomotive. The brake caliper is entrained through frictional engagement by the rotary motion of the brake disks. In other words, the deceleration force is transmitted to the brake caliper, which is not supported on a frame of the mass to be braked, for example, but rather on the pressure generating device 1.

A deceleration force 19 arising during braking is first transmitted to the first connecting means 2 as a compressive load. In addition, the pressure generating device 1 has a second connecting means 3 which is fastened rigidly to the frame of the mass to be braked, for example to the frame of a locomotive. The second connecting means 3 is therefore represented by an abutment element in FIG. 1.

The first connecting means 2 is rigidly connected to a sleeve unit 4. The sleeve unit 4 has a hollow configuration and has a through-opening 5, the boundary wall of which forms gripping arms 6 which come into engagement with a driver 7 under a tensile load. The driver 7 forms part of a piston unit 8 which comprises a piston rod 9 and a piston 10 in addition to the driver 7. In this case the piston rod 9 passes through a hydraulic chamber 11 which is filled with a hydraulic fluid such as hydraulic oil. The hydraulic chamber 11 is delimited by a pressure cylinder in the form of a cylindrical tube 12 and by the piston 10.

The cylindrical end 13 of the cylindrical tube 12 projects into a second hollow sleeve unit 14 which is rigidly connected to the second connecting means 3. The sleeve unit 14 is held in a stationary position with respect to the mass to be braked. Stated more precisely, the cylindrical end 13 of the cylindrical tube 12 passes through a through-opening 15 of the sleeve unit 14, the boundary wall of which again forms gripping arms 16. A flange section 17 is formed integrally on the cylindrical end 13 of the cylindrical tube 12 and acts as a stop shoulder, the gripping arms 16 forming a tensile abutment element which prevents the cylindrical tube 12 from being pulled out of the sleeve unit 14. The cylindrical tube 12, which is open at its cylindrical end 13, is closed in a fluid-tight manner by the piston 10 of the piston unit 8, so that egress of hydraulic fluid is avoided. The flange section 17 of the cylindrical tube 18 is located behind the through-opening 15 of the sleeve unit 14, so that the longitudinal movement of the cylindrical tube 12 is limited.

The first sleeve unit 4 is configured in such a way that its end oriented away from the connecting means 2 has the through-opening 5 through which the piston rod 9 extends. The driver 7 arranged on the free end of the piston rod 9 extends behind the through-opening 5, its surface thus having a larger diameter transversely to the pull direction than the through-opening 5. Under a tensile load the gripping arms 6 transmit a pull movement to the driver 7. Under a compressive load, by contrast, the gripping arms 6 are pressed against the cylindrical tube 12 and act as an abutment element or a rigid prolongation of the first connecting means 2.

Figure 2:
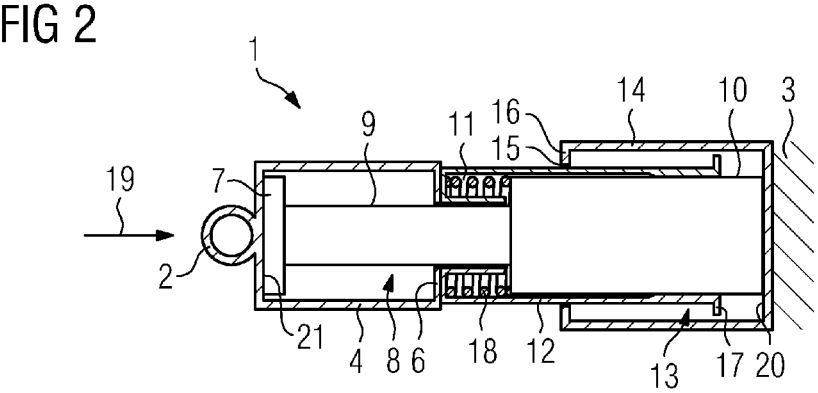
FIG. 2 shows the pressure generating device according to FIG. 1 under a compressive load.
Figure 6:
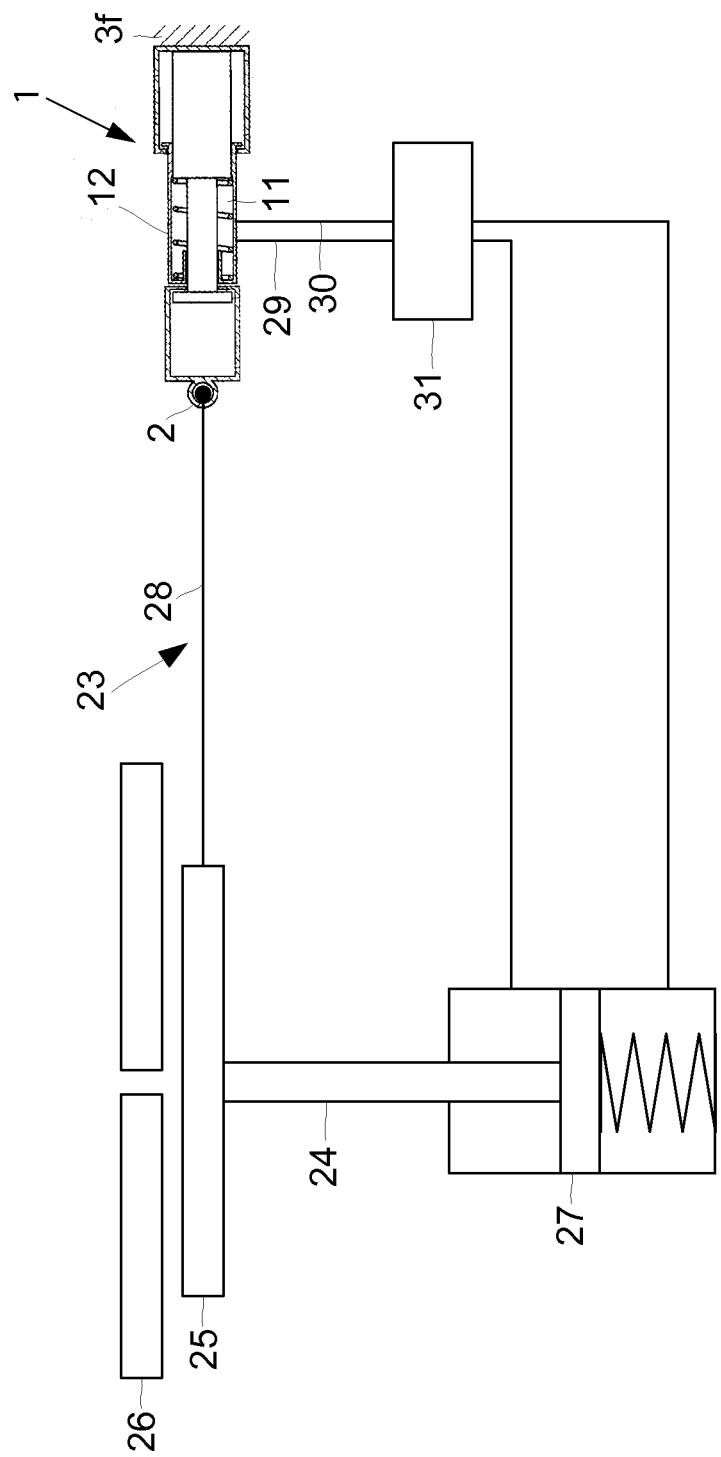

FIG. 2 shows the pressure generating device 1 according to FIG. 1 under compressive load, in which state a compressive force 19 in the direction of the arrow marked is transmitted to the connecting means 2. It can be seen that the gripping arms 6 of the sleeve unit 4, which act as a rigid prolongation of the first connecting means 2, press against the cylindrical tube 12, so that the cylindrical end 13 of the cylindrical tube 12 is displaced into the sleeve unit 14. As this happens the immobile piston 10 bearing against the fixed inner wall 20 of the sleeve unit 14 is pressed into the cylindrical tube 12, the hydraulic chamber 11 becoming smaller. In this way the hydraulic fluid of the hydraulic chamber 11 is pressurized. By means of the hydraulic connection 29, 30 the hydraulic pressure of the brake actuator 27 is increased, so that a self-energizing hydraulic brake is provided. In order to regulate the self-energization, control valves are provided in the hydraulic line. It should be noted, only for the sake of completeness, that the hydraulic line is connected to a hydraulic connection 29, 30 of the pressure cylinder 12. As shown in FIG. 6, the brake actuator 27 is part of a brake device 23 for braking a moving mass. The brake device 23 having a movably guided coupling member 24 for pressing a brake lining 25 against a brake surface 26 and the brake actuator 27 filled with hydraulic fluid and connected to the coupling member 24 for generating an application force which can be applied to the brake lining 25 via the coupling member 24, the brake lining 25 being connected via a mechanism 28 to the pressure generating device 1 which can be fastened to a frame 3f of the mass to be braked and which generates during braking a hydraulic pressure in the hydraulic chamber 11 connected to the brake actuator 27 via hydraulic lines 29, 30 and a control unit 31.

Figure 3:
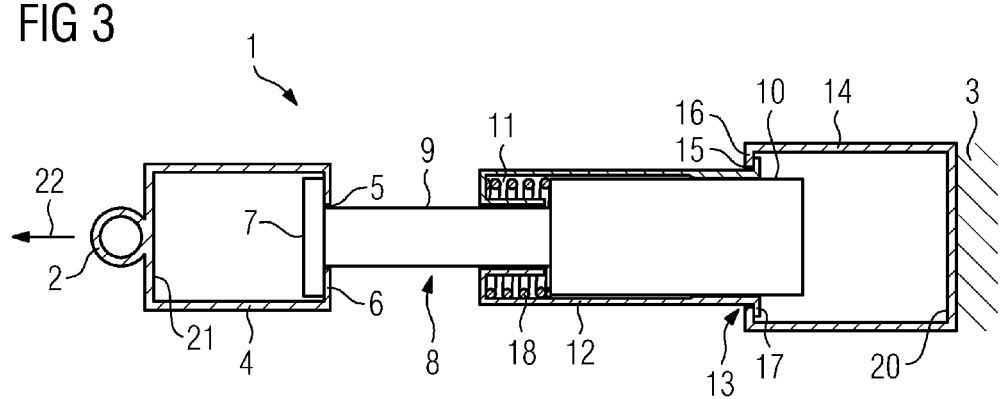
FIG. 3 shows the pressure generating device according to FIG. 1 under a tensile load.

FIG. 3 shows the pressure generating device 1 according to FIG. 1 under a tensile load, the tensile force 22 or, in other words, the deceleration force, being transmitted to the first connecting means 2 as a tensile load. In this case a pull stop is formed by the flange section 17 which abuts the fixed gripping arms 16 of the sleeve unit 14, so that the cylindrical tube 12 is held in a pull-resisting manner against the mass to be braked. The pull stop is also referred to here as the stop shoulder. The engagement between the driver 7 and the gripping arms 6 brings about a movement of the piston unit 8 to the left in the direction of the deceleration force 19, the piston 10 being moved to the left in the immobilized cylindrical tube 12 and the volume of the hydraulic chamber 11 decreasing.

A compression spring 18 is arranged in the hydraulic chamber 11 itself, which compression spring 18 ensures—in the un-energized state, that is, when the deceleration force 19 is absent—that the volume of the hydraulic chamber 11 increases again by displacing the piston unit 8 and the cylindrical tube 12 back to the starting position shown in FIG. 1. In order to be replenished with the necessary hydraulic fluid in this case, the hydraulic chamber 11 is connected via hydraulic connecting line (not shown) to a hydraulic chamber tank or to an equalizing container (not shown in the figures).

Figure 4:
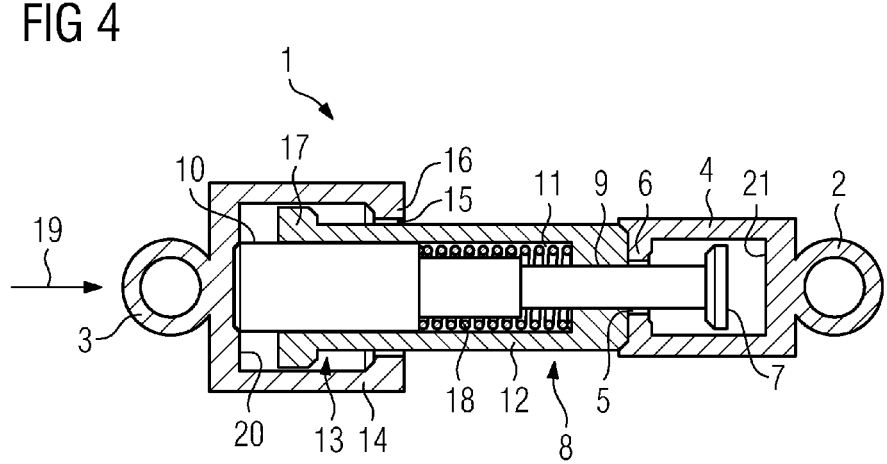
FIG. 4 shows the pressure generating device according to FIG. 1 under compressive load, the compressive force being transmitted to the other connecting means.

FIG. 4 shows the pressure generating device 1 according to FIG. 1 under a compressive load 19, the pressure generating device 1 having been rotated through 180° as compared to the representation in FIG. 2, and the compressive or deceleration force 19 being transmitted in the direction shown to the second connecting means 3 which, in the pressure generating device 1 according to FIG. 2, was rigidly connected to the frame of the mass to be braked. In FIG. 4, by contrast, the first connecting means 2 is coupled rigidly to said frame. It can be seen that the second sleeve unit 14 bears with its inner wall 20 against the piston 10 and has pushed said piston 10 into the cylindrical tube 12, the volume of the hydraulic chamber 11 being reduced. As this happens the piston rod 9 and the driver 7 are displaced within the first hollow sleeve unit 4. The hollow sleeve unit 4 therefore makes possible free travel of the rigid piston unit 8 under a compressive load 19. The free travel corresponds to the distance of the driver 7 from the opposite inner wall 21 of the sleeve unit 4.

Figure 5:
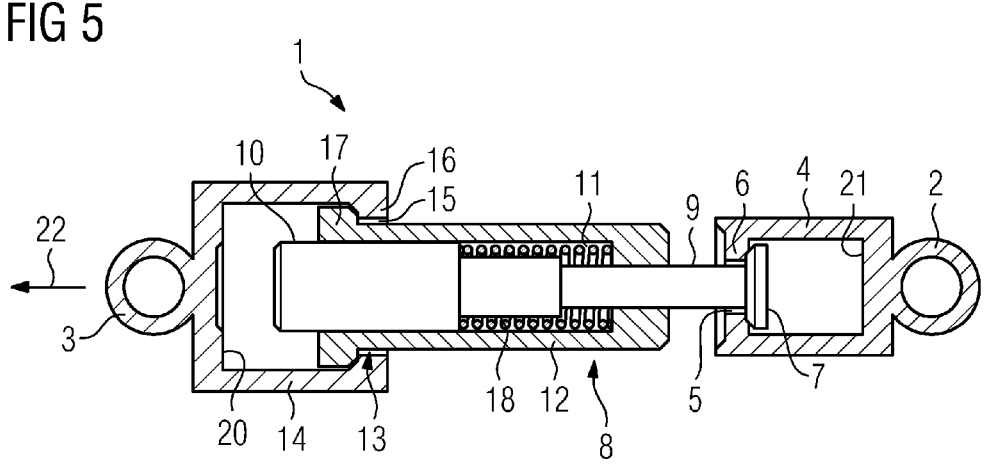
FIG. 5 shows the pressure generating device according to FIG. 1 under tensile load, the tensile force being transmitted to the other connecting means, and FIG. 6 a schematic drawing of a brake device including the pressure generating device.

FIG. 5 shows the pressure generating device 1 according to FIG. 4 under a tensile load 22. It can be seen that the gripping arms 16, by engaging with the flange section 17 of the cylindrical tube 12 acting as the stop shoulder, move the cylindrical tube 12 away from the sleeve unit 4. As a result of the engagement of the driver 7 with the gripping arms 6 of the first sleeve unit 4, the piston unit 8 is held stationary with respect to the mass, with a consequent reduction of the volume of the hydraulic chamber 11 and therefore a pressurization of the hydraulic fluid.

The invention claimed is:
1. A pressure generating device for generating a hydraulic pressure as a result of a tensile or compressive load, comprising:
   connecting means including a connector connectable to a mechanism for transmitting a mechanical tensile or compressive load;

a pressure cylinder;

a piston unit extending at least partially and movably in said pressure cylinder, said piston unit, together with said pressure cylinder delimiting a hydraulic chamber filled with hydraulic fluid;

a coupling assembly connecting said connecting means to said pressure cylinder or to said piston unit, said coupling means being configured to cause said hydraulic chamber to be pressurized under a tensile load as well as under a compressive load, said coupling assembly including hollow sleeve units, each said sleeve unit forming gripping arms configured, under a tensile load, for coming into engagement with stop shoulders formed on said piston unit or on said pressure cylinder, so that said gripping arms and said stop shoulders form tensile coupling means.

2. The pressure generating device according to claim 1, wherein said connecting means include a further connector rigidly connected to a frame.

3. The pressure generating device according to claim 1, wherein, under a compressive load, said gripping arms of one of said sleeve units bear against said pressure cylinder, while said piston unit bears against an abutment element, such that said gripping arms and said abutment element form compressive coupling means.

4. The pressure generating device according to claim 3, wherein said abutment element is an inner wall of another said sleeve unit.

5. The pressure generating device according to claim 1, wherein said pressure cylinder is a cylindrical tube arranged at least partially in one of said hollow sleeve units and having a flange section forming said stop shoulder, which under a tensile load comes into engagement with said gripping arms of said sleeve unit.

6. The pressure generating device according to claim 1, wherein said piston unit has a driver arranged in one of said sleeve units and a piston disposed in said pressure cylinder and delimiting said hydraulic chamber, wherein said piston and said driver are connected to one another by way of a piston rod, and said driver extends behind said gripping arms of said sleeve unit in which said driver is arranged.

7. The pressure generating device according to claim 1, which comprises a compression spring disposed in said hydraulic chamber and bearing against said pressure cylinder and said piston unit.

8. A brake device for braking a moving mass, the brake device comprising:

a pressure generating device according to claim 1 mounted to a frame of the moving mass to be braked;

a movably guided coupling member for pressing a brake lining against a brake surface;

a brake actuator filled with a hydraulic fluid and connected to said coupling member for generating an application force to be applied to said brake lining via said coupling member;

a mechanism connecting said brake lining to said pressure generating device, said pressure generating device generating, during braking, a hydraulic pressure in a hydraulic chamber connected to said brake actuator via hydraulic lines.

9. The brake device according to claim 8, which comprises closed-loop control means for regulating a deceleration force to be injected as a tensile load or a compressive load into the connecting means of said pressure generating device via said mechanism.

10. A pressure generating device for generating a hydraulic pressure as a result of a tensile or compressive load, comprising:

connecting means including a connector connectable to a mechanism for transmitting a mechanical tensile or compressive load;

a pressure cylinder;

a piston unit extending at least partially and movably in said pressure cylinder, said piston unit, together with said pressure cylinder delimiting a hydraulic chamber filled with hydraulic fluid;

a coupling assembly connecting said connecting means to said pressure cylinder or to said piston unit, said coupling means being configured to cause said hydraulic chamber to be pressurized under a tensile load as well as under a compressive load, said coupling assembly including hollow sleeve units, each of said sleeve units forming gripping arms;

said pressure cylinder being a cylindrical tube arranged at least partially in one of said hollow sleeve units and having a flange section forming a stop shoulder, which under a tensile load comes into engagement with said gripping arms of said sleeve unit.

11. A pressure generating device for generating a hydraulic pressure as a result of a tensile or compressive load, comprising:

connecting means including a connector connectable to a mechanism for transmitting a mechanical tensile or compressive load;

a pressure cylinder;

a piston unit extending at least partially and movably in said pressure cylinder, said piston unit, together with said pressure cylinder delimiting a hydraulic chamber filled with hydraulic fluid;

a coupling assembly connecting said connecting means to said pressure cylinder or to said piston unit, said coupling means being configured to cause said hydraulic chamber to be pressurized under a tensile load as well as under a compressive load, said coupling assembly including hollow sleeve units, each of said sleeve units forming gripping arms;

said piston unit having a driver arranged in one of said sleeve units and a piston disposed in said pressure cylinder and delimiting said hydraulic chamber, said piston and said driver being connected to one another by a piston rod, and said driver extending behind said gripping arms of said sleeve unit in which said driver is arranged.

* * * * *